(12) United States Patent
Richards

(10) Patent No.: US 6,237,311 B1
(45) Date of Patent: May 29, 2001

(54) REVERSE MOWING PREVENTION DEVICE

(76) Inventor: William R. Richards, Route 4 Box 485, Center, TX (US) 75935

( * ) Notice: Subject to any disclaimer, the term of this patent is extended or adjusted under 35 U.S.C. 154(b) by 0 days.

(21) Appl. No.: 09/419,722

(22) Filed: Oct. 14, 1999

(51) Int. Cl.[7] .................................................. A01D 69/00
(52) U.S. Cl. .............................. 56/10.5; 56/11.2; 56/11.3; 56/16.7
(58) Field of Search .................................. 56/10.5, 11.3, 56/11.2, 16.7, DIG. 15, 10.8

(56) References Cited

U.S. PATENT DOCUMENTS

| | | |
|---|---|---|
| 3,984,967 | * 10/1976 | Jones . |
| 4,016,709 | * 4/1977 | Houser et al. . |
| 4,058,957 | * 11/1977 | Roseberry . |
| 4,300,332 | 11/1981 | Jackson .................................. 56/11.3 |
| 6,026,634 | * 2/2000 | Peter et al. . |

* cited by examiner

Primary Examiner—H. Shackelford

(74) Attorney, Agent, or Firm—John M. Harrison

(57) ABSTRACT

A device for preventing reverse mowing of a Snapper, rear engine rider lawnmower having an ABS system, by halting rotation of the mower blade when the gear shift lever of the mower is shifted from the forward into the reverse driving position. The reverse mowing prevention device is designed to be mounted on riding mowers having a blade engagement lever for selectively engaging a mower blade in driving configuration and a pivoting lever retaining member for selectively retaining the blade engagement lever in the blade-driving configuration, typically by depression of a blade engagement foot pedal. In a first embodiment the reverse mowing prevention device is characterized by a blade release rod for connecting the lever retaining member to the shift linkage of the mower transmission system. As the gear shift lever is shifted from the forward to the reverse driving position, as desired, the blade release rod disengages the pivoting lever retaining member from the blade engagement lever, which automatically shifts to a blade-disengaging position and halts rotation of the mower blade. In another embodiment the blade release rod is capable of selectively engaging and removing the lever retaining member from the blade engagement lever, or disengaging the lever retaining member as the gear shift lever is shifted into reverse, to permit reverse mowing as desired.

16 Claims, 4 Drawing Sheets

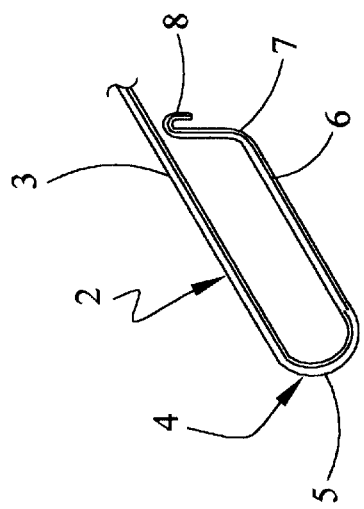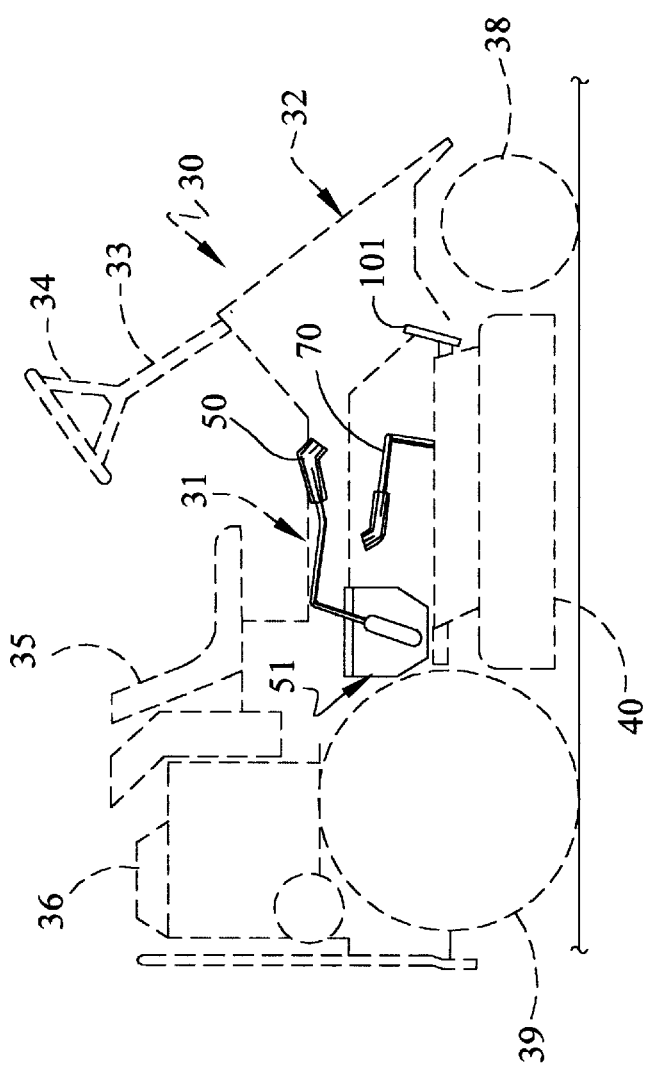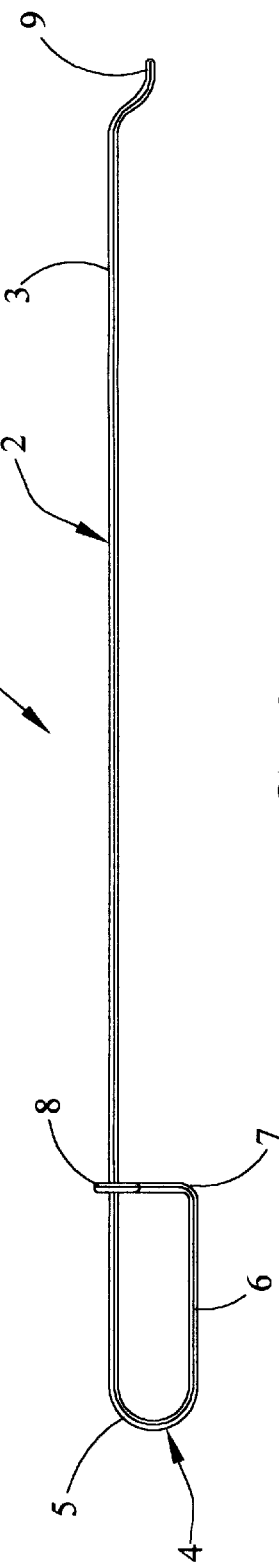

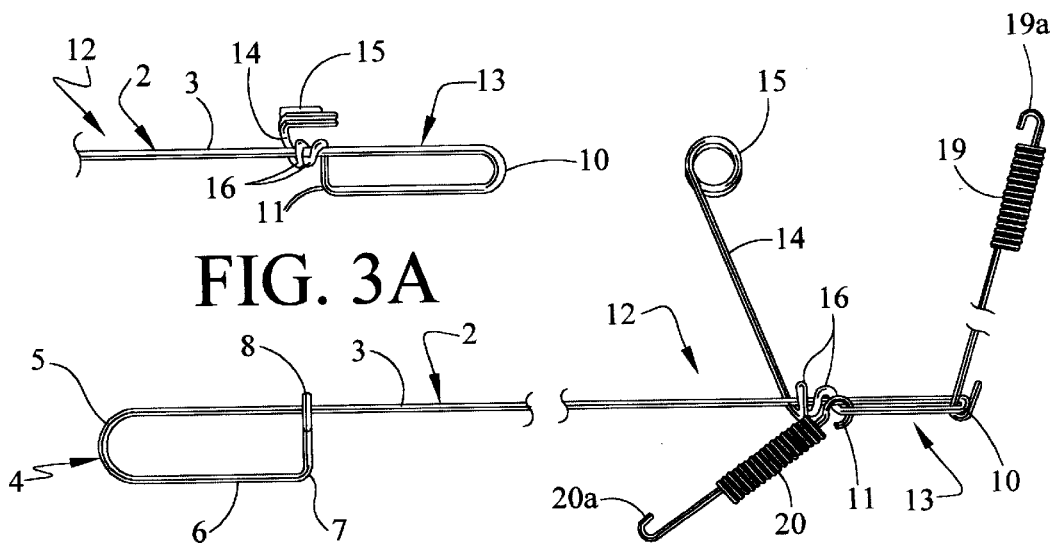
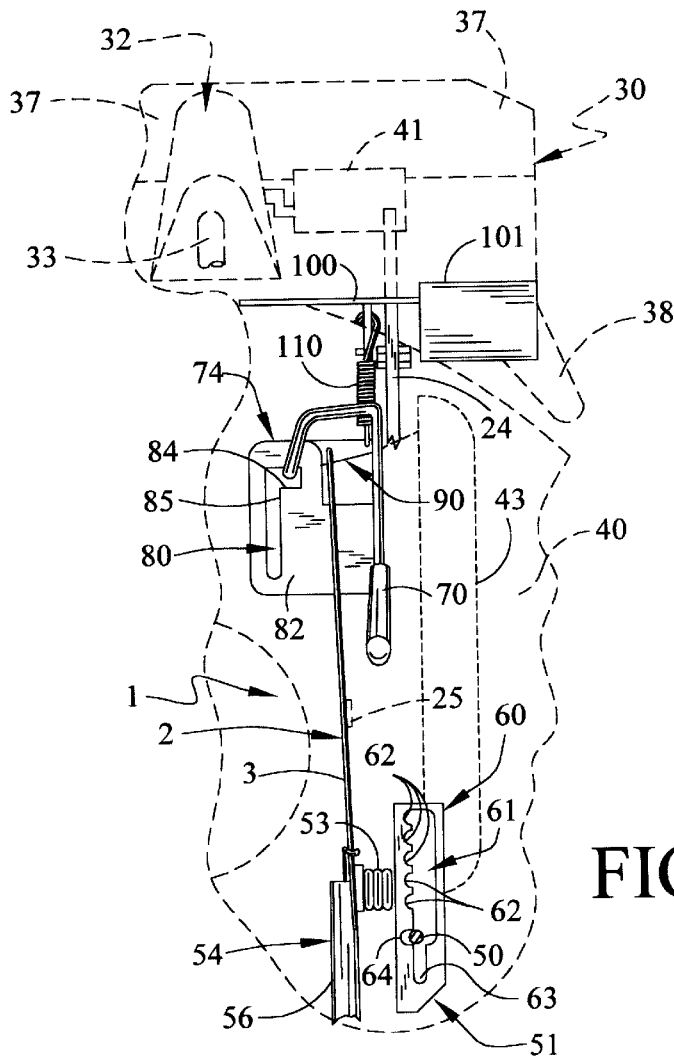

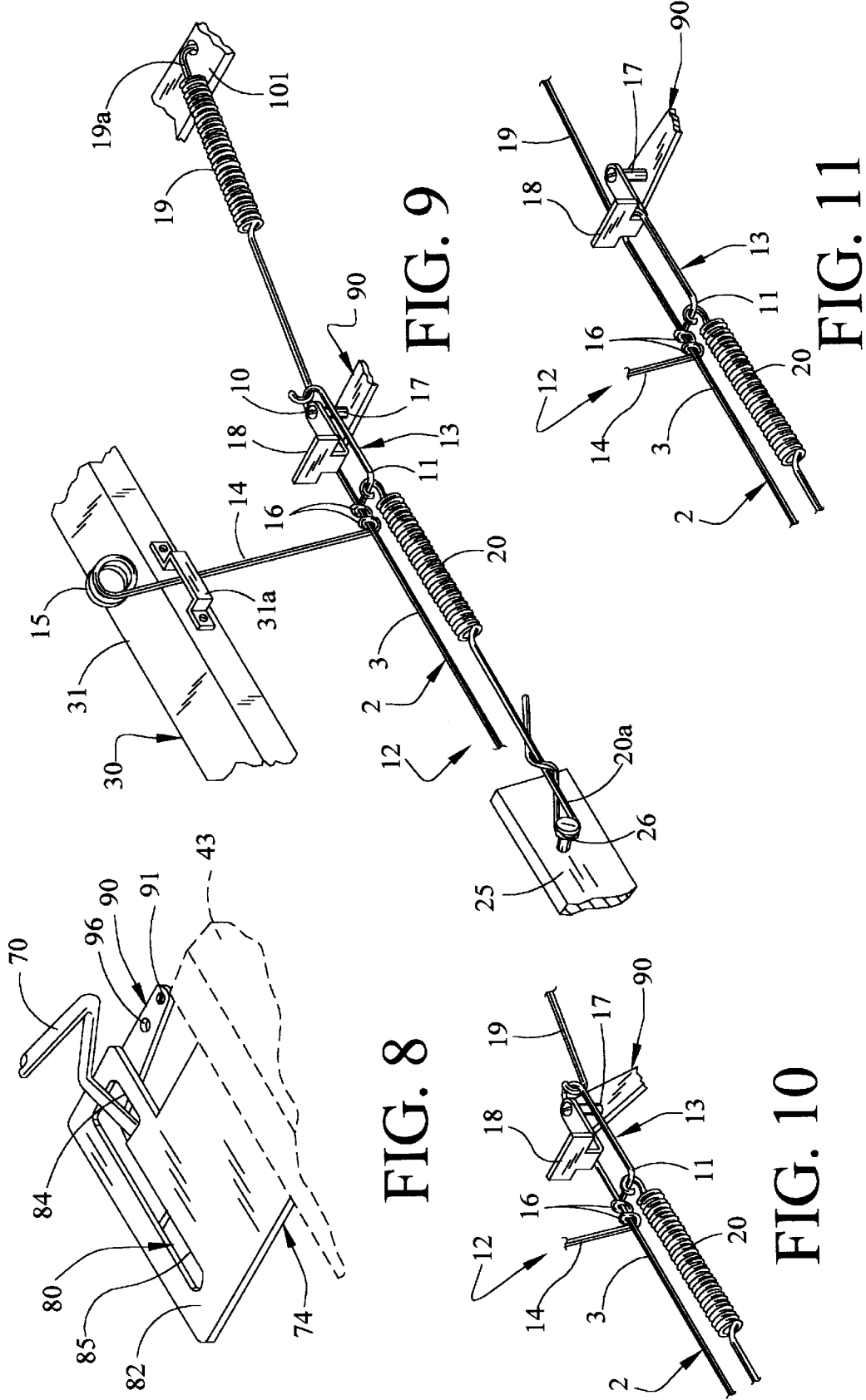

REVERSE MOWING PREVENTION DEVICE

BACKGROUND OF THE INVENTION

1. Field of the Invention

This invention relates to safety devices for Snapper, rear engine rider lawn mowers and more particularly, to a device for preventing reverse mowing of the lawnmower by halting rotation of the mower blade when the gear shift lever of the mower is shifted from the forward into the reverse driving position. In a preferred embodiment the reverse mowing prevention device is designed to be mounted on Snapper riding mowers having an automatic blade stop (ABS) system characterized by a manually-operated blade engagement lever for selectively engaging a mower blade in driving configuration and a pivoting lever retaining member for selectively retaining the blade engagement lever in the blade-driving configuration, typically by depressing a foot-operated blade engagement pedal. In a first embodiment the reverse mowing prevention device is characterized by a blade release rod having a front end for engaging the lever retaining member and a rear end for engaging the shift linkage of the mower transmission system. Forward mowing is accomplished in the conventional manner by shifting the blade engagement lever forwardly into the blade-driving position, depressing the blade engagement pedal to cause the pivoting lever retaining member to engage and retain the blade engagement lever in the blade-driving position, and then shifting the gear shift lever from neutral into the forward driving position. As the gear shift lever is subsequently shifted to the reverse driving position, as desired to facilitate driving the mower in reverse, the blade release rod pulls and disengages the lever retaining member from the blade engagement lever, which automatically shifts to a blade-disengaging position and halts rotation of the mower blade. In another embodiment a blade release bolt is mounted on the lever retaining member and a blade release loop shaped in the front end of the blade release rod engages the blade release bolt under spring tension to pull the blade release bolt rearwardly and disengage the lever retaining member from the blade engagement lever as the gear shift lever is shifted into the reverse driving position. To permit reverse mowing, as desired, an override handle provided on the blade release rod can be lifted against spring tension to clear the blade release loop from the blade release bolt as the gear shift lever is shifted into the reverse driving position.

Although riding lawnmowers are widely used for mowing both business and residential lawns, operation of a riding lawnmower can be particularly dangerous in residential areas where children frequently play outdoors and pets roam. When a riding mower is operated in the reverse direction, it is typically difficult for the mower operator to view the area directly behind the mower, and consequently, children standing or sitting behind riding mowers have on occasion been run over and severely injured or killed by the mower blade because the mower operator failed to adequately view the area behind the mower prior to mowing in reverse. This has resulted in increasing safety requirements being imposed on manufacturers to design riding mowers which are safer to operate and which require conscious effort on the part of the mower operator to mow m reverse, to increase the likelihood that the operator will first deliberately examine the area behind the mower for children, animals or other obstructions.

2. Description of the Prior Art

One safety mechanism for minimizing inadvertent actuation of a mower cutting blade and which is currently in widespread use on riding mowers, is the "Safety Control for Riding Lawn Mower" described in U.S. Pat. No. 4,300,332, dated Nov. 17, 1981, to Harold P. Jackson. The safety control automatically halts rotation of a mower cutting blade when the mower operator leaves or falls off the mower or raises his or her feet while seated on the mower. The control is operated by means of a foot pedal which is depressed by the operator's foot to cause the blade to rotate during the cutting operation. When the operator raises his or her feet from the foot pedal or falls from or dismounts the mower, the control activates a mechanism for disengaging the blade drive and applying a brake to the cutting blade. While the safety control allows the operator to manually disengage the blade drive and apply a brake to the cutting blade while the pedal is depressed, the control will not allow the operator to re-engage the blade drive while the pedal is depressed.

An object of this invention is to provide a device for preventing a riding mower from mowing in reverse.

Another object of this invention is to provide a reverse mowing prevention device for preventing reverse mowing of a Snapper riding lawnmower by halting rotation of the mower blade when the gear shift lever of the mower is shifted into the reverse driving position.

Still another object of this invention is to provide a reverse mowing prevention device for selectively preventing reverse mowing of a Snapper riding lawnmower and which device is provided with an override mechanism for selectively enabling the riding mower to mow in reverse.

Yet another object of this invention is to provide a reverse mowing prevention device for riding mowers having a blade engagement lever for selectively engaging a mower blade in driving configuration and a lever retaining member for selectively retaining the blade engagement lever in the blade-driving configuration, typically by depressing a foot-operated blade engagement pedal, which reverse mowing prevention device is characterized by a blade release rod for connecting the lever retaining member to the shift linkage of the mower transmission system, such that as the gear shift lever is shifted from the forward into the reverse driving position, as desired, the blade release rod disengages the pivoting lever retaining member from the blade engagement lever, and the blade engagement lever automatically shifts to a blade-disengaging position and halts rotation of the mower blade.

A still further object of this invention is to provide a reverse mowing prevention device for riding mowers having an automatic blade stop (ABS) system characterized by a blade engagement lever for selectively engaging a mower blade in driving configuration and a lever retaining member for selectively retaining the blade engagement lever in the blade-driving configuration typically by depressing a foot-operated blade engagement pedal, which reverse mowing prevention device is characterized by a blade release bolt upward-standing from the lever retaining member and a blade release loop shaped in the front end of the blade release rod for engaging the blade release bolt under spring tension, wherein the blade release loop pulls the blade release bolt rearwardly and disengages the lever retaining member from the blade engagement lever as the gear shift lever is shifted into the reverse driving position, causing the blade engagement lever to automatically shift to a blade-disengaging position; and wherein an override handle provided on the blade release rod can be selectively lifted against spring tension to clear the blade release loop from the blade release bolt as the gear shift lever is shifted into reverse, in order to permit mowing in reverse, as desired.

SUMMARY OF THE INVENTION

These and other objects of the invention are provided in a reverse mowing prevention device for preventing reverse mowing of a riding-type lawnmower by halting rotation of the mower blade when the gear shift lever of the mower is shifted from the forward into the reverse driving position. In a preferred embodiment the reverse mowing prevention device is designed to be mounted on riding mowers having an automatic blade stop (ABS) system characterized by a typically manually-operated blade engagement lever for selectively engaging a mower blade in driving configuration and a pivoting lever retaining member for selectively retaining the blade engagement lever in the blade-driving configuration, typically by depression of a foot-operated blade engagement pedal. In a first embodiment the reverse mowing prevention device is characterized by a blade release rod having a front end for engaging the lever retaining member and a rear end for engaging the shift linkage of the mower transmission system. Forward mowing is accomplished in the conventional manner by shifting the blade engagement lever forwardly into the blade-driving configuration, depressing the blade engagement pedal to cause the pivoting lever retaining member to engage and retain the blade engagement lever in the blade-driving position, and shifting the gear shift lever from neutral to the forward driving position. As the gear shift lever is subsequently shifted from the forward into the reverse driving position, as desired, the blade release rod pulls and disengages the lever retaining member from the blade engagement lever, which automatically shifts to a blade-disengaging position and halts rotation of the mower blade. In another embodiment a blade release bolt is upward-standing from the lever retaining member and a blade release loop shaped in the front end of the blade release rod engages the blade release bolt under spring tension, to pull the blade release bolt rearwardly and pivot and disengage the lever retaining member from the blade engagement lever as the gear shift lever is shifted into reverse. To permit reverse mowing, as desired, an override handle provided on the blade release rod can be lifted against spring tension to clear the blade release loop from the blade release bolt as the gear shift lever is shifted into reverse.

BRIEF DESCRIPTION OF THE DRAWINGS

The invention will be better understood by reference to the accompanying drawings, wherein:

FIG. 1 is a side view of a riding mower, illustrated in phantom, with the blade engagement pedal, blade engagement lever and gear shift lever components of the mower illustrated in solid lines;

FIG. 2 is a side view of a preferred embodiment of the reverse mowing prevention device of this invention;

FIG. 2A is a perspective view of the shift loop element of the blade release rod;

FIG. 3 is a side view of another embodiment of the reverse mowing prevention device;

FIG. 3A is a bottom view, partially in section, of the reverse mowing prevention device illustrated in FIG. 3;

FIG. 4 is a top view, partially in section, of the riding mower illustrated in FIG. 1, most of which is illustrated in phantom and more particularly illustrating the embodiment of the reverse mowing prevention device illustrated in FIG. 2, mounted on the riding mower;

FIG. 8 is a perspective view, partially in section, of the blade lever bracket and blade engagement lever, with the blade engagement lever positioned in the blade-driving position in the blade lever bracket;

FIG. 9 is a perspective view, partially in section, of the reverse mowing prevention device illustrated in FIG. 3, more particularly illustrating an override handle provided on the device for facilitating reverse mowing and a handle bracket provided on the mower frame for receiving the override handle;

FIG. 10 is a perspective view, partially in section, of a blade release bolt upward-standing on the lever retaining member of the riding mower, with the reverse mowing prevention device engaging the blade release bolt to facilitate disengaging the lever retaining member from the blade engagement lever upon reverse movement of the gear shift lever; and FIG. 11 is a perspective view, partially in section, of the blade release bolt and lever retaining member illustrated in FIG. 10, with the reverse mowing prevention device lifted from the blade release bolt upon reverse movement of the gear shift lever to facilitate mowing in reverse.

DESCRIPTION OF THE PREFERRED EMBODIMENTS

Figure 7:
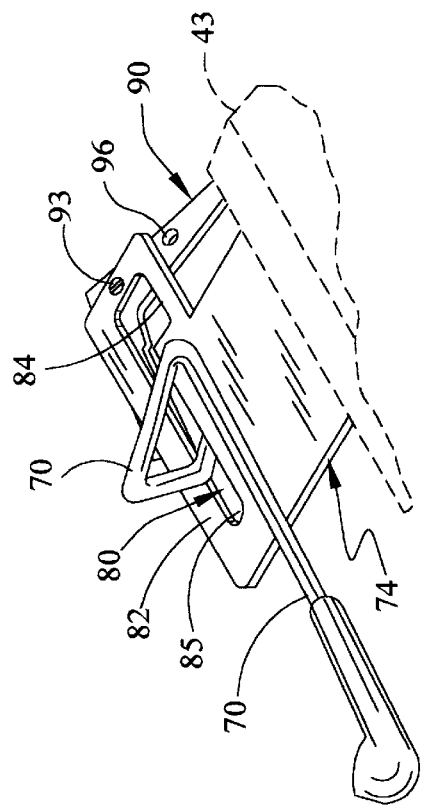
FIG. 7 is a perspective view, partially in section, of the blade lever bracket and blade engagement lever components of the riding mower, with the blade engagement lever positioned in the blade-disengaging position in the blade lever bracket.
Figure 6:
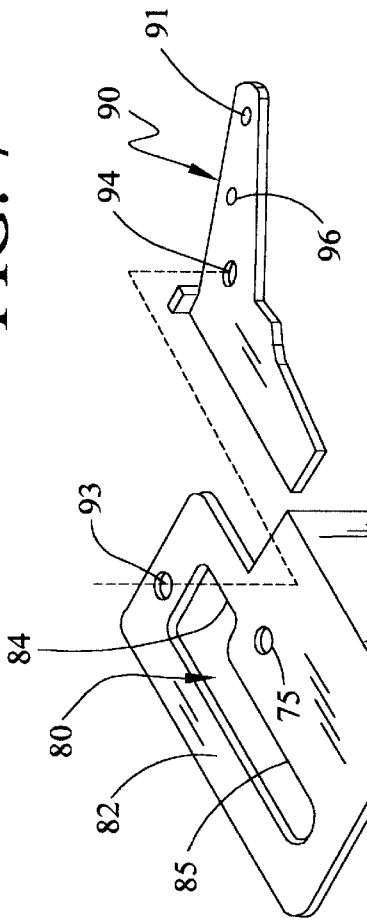
FIG. 6 is an exploded, perspective view of a blade lever bracket component of the riding mower, more particularly illustrating attachment of the lever retaining member component of the riding mower to the blade lever bracket.
Figure 5:
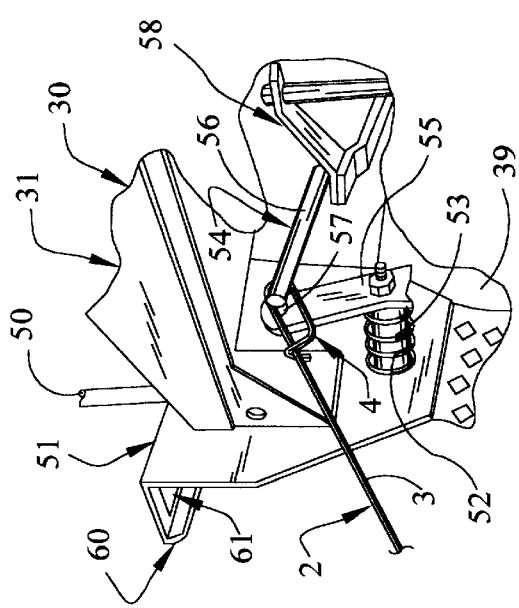
FIG. 5 is a perspective view, partially in section, of the transmission shift linkage of the riding mower, with the reverse mowing prevention device of this invention connected to the shift linkage.

Referring initially to FIGS. 1, 2 and 4–8 of the drawings, in a first preferred embodiment, the reverse mowing prevention device of this invention is generally illustrated by reference numeral 1. The reverse mowing prevention device 1 is designed to be mounted on a riding mower 30, and typically a SNAPPER (trademark) riding mower 30, illustrated in phantom and fitted with an automatic blade stop (ABS) feature, as hereinafter further described. The riding mower 30 is characterized by a mower frame 31, made portable by front wheels 38 and rear wheels 39, which rear wheels 39 are driven by a gasoline-powered engine 36 mounted on the rear of the mower frame 31. A seat 35 is provided on the mower frame 31, typically in front of the engine 36, for accommodating a mower operator (not illustrated) on the riding mower 30, and a foot platform 37 (FIG. 4) is provided on the front of the mower frame 31 for receiving and resting the feet of the mower operator. The riding mower 30 is further characterized by a steering unit 32, provided on the front of the mower frame 31 and which mounts a steering column 33, fitted with a steering wheel 34 for steering the front wheels 38. A foot-operated brake pedal 41 (FIG. 4), provided on the foot platform 37, facilitates selective application of brake pressure to the front wheels 38. A pair of frame arms 24 (one of which is illustrated in FIG. 4) extends rearwardly from the foot platform 37, on each side of the steering unit 32, and a blade housing 40, which houses the mower cutting blade (not illustrated), is attached to the frame arms 24, between the front wheels 38 and rear wheels 39.

As further illustrated in FIGS. 1 and 4, the riding mower 30 is fitted with a gear shift lever 50 for controlling directional movement of the riding mower 30. A shift detent bracket 51 is typically mounted on the mower frame 31 and includes a gear selector plate 60, provided with an elongated lever slot 61, through which the gear shift lever 50 extends, as illustrated in FIG. 4. The lever slot 61 is provided with multiple forward selector notches 62, each of which receives the gear shift lever 50 to engage the riding mower 30 in a selected speed forward driving mode; a neutral selector notch 64 for engaging the riding mower in neutral; and a rear selector notch 63 for engaging the riding mower 30 in reverse driving mode, as desired. Manually-actuated, forward or reverse motion of the gear shift lever 50 in the lever slot 61 is transmitted to a shift linkage 54 (illustrated in FIGS. 4 and 5) which, in turn, transmits the motion of the gear shift lever 50 to a transmission linkage 58 of the mower transmission system (not illustrated), to establish the forward, neutral or reverse driving mode of the riding mower 30, as hereinafter described. The bottom end of the gear shift lever 50 is connected to a horizontal shift rod 52 (FIG. 5) of the shift linkage 54, which horizontal shift rod 52 extends through an opening in the shift detent bracket 51, and one end of a first linkage member 55 is connected to the extending end of the horizontal shift rod 52. A spacer spring 53 is typically interposed between the shift detent bracket 51 and the first linkage member 55 to maintain the first linkage member 55 in spaced-apart relationship with respect to the shift detent bracket 51. A second linkage member 56 is pivotally connected at one end to the extending end of the first linkage member 55 by means of a linkage pin 57 and the opposite end of the second linkage member 56 is pivotally connected to the transmission linkage 58. Accordingly, as the gear shift lever 50 is shifted rearwardly in the lever slot 61 from one of the forward selector notches 62 (provided in the gear selector plate 60) or neutral selector notch 64 and into the rear selector notch 63 to facilitate driving the riding mower 30 in reverse (FIG. 4), the horizontal shift rod 52 rotates in the clockwise direction as viewed in FIG. 5 and moves the first linkage member 55 and second linkage member 56 of the shift linkage 54 rearwardly, which second linkage member 56, in turn, moves the transmission linkage 58 rearwardly, and this action shifts the riding mower 30 into the reverse driving mode. Conversely, as the gear shift lever 50 is shifted forwardly in the lever slot 61 from the rear selector notch 63 or neutral selector notch 64 and into a selected one of the forward selector notches 62, the horizontal shift rod 52 rotates in the counterclockwise direction as viewed in FIG. 5 and moves the first linkage member 55, second linkage member 56 and transmission linkage 58 forwardly, thereby shifting the riding mower 30 into the forward driving mode.

As illustrated in FIGS. 1, 4 and 6–8 of the drawings, the riding mower 30 is also typically fitted with an automatic blade stop (ABS) feature which automatically halts rotation of the rotating mower cutting blade, should the mower operator dismount, lift his or her feet or inadvertently fall from the riding mower 30. Accordingly, a manually-operated blade engagement lever 70 is typically provided on the riding mower 30 for selectively engaging the mower cutting blade driving mechanism (not illustrated), as hereinafter described. As illustrated in FIGS. 7 and 8, the blade engagement lever 70 extends through an elongated, substantially L-shaped lever slot 80, provided in the bracket plate 82 of a blade lever bracket 74, which is mounted on a blade housing bracket 43, upward-standing from the blade housing 40 of the riding mower 30, as illustrated in FIG. 4. The lever slot 80 includes an enlarged portion 84, through which the blade engagement lever 70 extends when in the forward, blade-driving position, and an elongated, more narrow portion 85, through which the blade engagement lever 70 extends when shifted into the rear, blade-disengaging position, as hereinafter further described. The bottom end of the blade engagement lever 70 is connected to a blade drive engaging and disengaging mechanism (not illustrated), as detailed in U.S. Pat. No. 4,300,332, and the blade engagement lever 70 is manually shifted forwardly from the elongated portion 85 and into the enlarged portion 84 of the lever slot 80 to engage the blade-driving mechanism and cause rotation of the mower cutting blade (not illustrated) during operation of the engine 36. As further illustrated in FIG. 6, a roller bolt opening 75 extends through the bracket plate 82, between the enlarged portion 84 and elongated portion 85 of the lever slot 80, and a shift roller (not illustrated) is rotatably mounted on a roller bolt (also not illustrated), which extends through the roller bolt opening 75. The shift roller normally causes the blade engagement lever 70 to automatically shift from the blade drive engaging position in the enlarged portion 84, into the blade drive disengaging position in the elongated portion 85 of the lever slot 80, when the operator of the riding mower 30 releases the blade engagement lever 70. Accordingly, the blade engagement lever 70 remains in the elongated, narrow portion 85 and the mower blade thus remains disengaged from the blade drive mechanism, unless the blade engagement lever 70 is retained in the enlarged portion 84 of the lever slot 80, as hereinafter further described. As further illustrated in FIG. 6, a substantially L-shaped lever retaining member 90 is pivotally mounted on the bracket plate 82, by means of a pivot bolt (not illustrated) which extends through a bracket aperture 93 and through a registering retainer mount aperture 94, provided in the lever retaining member 90. Accordingly, the retaining member 90 is moveable between a lever retaining position illustrated in FIG. 8, in which it engages and retains the blade engagement lever 70 in the enlarged portion 84 of the lever slot 80, and a lever release position illustrated in FIG. 7, in which the retaining member 90 disengages and enables the blade engagement lever 70 to automatically shift from the enlarged portion 84 to the elongated narrow portion 85 of the lever slot 80, by operation of the shift roller (not illustrated). The retaining member 90 is pivoted on the bracket plate 82 between the lever retaining position and the lever release position typically by operation of a foot bar 100, fitted with foot pedals 101 (one of which is illustrated in FIG. 4). One end of a pedal tension spring 110 extends through a tension spring opening 91 (FIG. 8) and connects to the lever retaining member 90, and the other end of the pedal tension spring 110 is connected to the foot bar 100, and operates to pivot the lever retaining member 90 from the lever release position illustrated in FIG. 7, to the lever retaining position as illustrated in FIGS. 4 and 8, when the operator of the riding mower 30 depresses the blade engagement pedal 101. By manually shifting the blade engagement lever 70 from the elongated portion 85 into the enlarged portion 84 of the lever slot 80 and then depressing the blade engagement pedal 101 using his or her feet during operation of the engine 36, the mower operator retains the blade engagement lever 70 in the enlarged portion 84 of the lever slot 80 and maintains the mower cutting blade (not illustrated) in rotating, grass-cutting configuration. When the mower operator releases the blade engagement pedal 101, the lever retaining member 90 pivots to the lever release position illustrated in FIG. 7 and the blade engagement lever 70 automatically shifts from the enlarged portion 84 to the elongated, narrow portion 85 of the lever slot 80 by operation of the shift roller (not illustrated) and disengages the blade drive mechanism from the mower cutting blade. A brake system (not illustrated) is simultaneously applied to the cutting blade shaft (not illustrated), to halt rotation of the cutting blade upon release of the blade engagement pedal 101. Accordingly, the ABS safety mechanism of the prior art riding mower 30 imparted by the lever retaining member 90, blade engagement pedal 101, pedal tension spring 110 and blade brake mechanism (not illustrated) is designed to halt rotation of the mower cutting blade, should the mower operator dismount or inadvertently fall from the riding mower 30 or raise his or her foot from the blade engagement pedal 101.

Referring next to FIGS. 2 and 2A of the drawings, in a first preferred embodiment the reverse mowing prevention device of this invention is generally illustrated by reference numeral 1. The reverse mowing prevention device 1 is characterized by an elongated blade release rod 2, typically constructed from stainless steel and including an elongated straight rod segment 3, terminated on the end thereof by a retaining member segment 9, which is inserted in a blade release rod opening 96 provided in the lever retaining member 90 (FIG. 8) of the riding mower 30, as hereinafter described. A shift loop 4 is shaped in the opposite end of the straight rod segment 2 and includes a rod bend 5, continuous with the straight rod segment 3 and a short rod segment 6, continuous with the rod bend 5 and substantially parallel to the straight rod segment 3. A substantially perpendicular rod angle 7 is shaped in the short rod segment 6, and terminates in a rod hook 8, for removably engaging the straight rod segment 3 of the blade release rod 2, as illustrated in FIG. 2 and hereinafter further described.

Referring again to FIGS. 2, 2A, 4, 5, 7 and 8 of the drawings, in application of the first preferred embodiment of the reverse mowing prevention device 1, the shift loop 4 of the blade release rod 2 (located at the rear end of the straight rod segment 3 as illustrated in FIG. 2) is initially attached to the shift linkage 54 of the riding mower 30 as illustrated in FIG. 5. Accordingly, the shift loop 4 is first opened as illustrated in FIG. 2A by removing the rod hook 8 from the straight rod segment 3 and is extended around the linkage pin 57 of the shift linkage 54. The shift loop 4 is then closed around the linkage pin 57 by re-engaging the rod hook 8 with the straight rod segment 3. The retaining member segment 9 (located at the front end of the straight rod segment 3) is next inserted through the blade release rod opening 96 (provided in the lever retaining member 90 adjacent to the tension spring opening 91, as illustrated in FIGS. 4 and 8). Accordingly, the blade release rod 2 of the reverse mowing prevention device 1 now connects the lever retaining member 90 to the shift linkage 54 of the riding mower 30. Conventional operation of the riding mower 30 is commenced by starting the engine 36 while the gear shift lever 50 is located in the neutral selector notch 64 of the gear selector plate 60, as illustrated in FIG. 4, and mowing is begun by shifting the blade engagement lever 70 forwardly from the elongated, narrow portion 85 into the enlarged portion 84 of the lever slot 80, to engage the drive mechanism of the mower cutting blade (not illustrated). While holding the blade engagement lever 70 in the enlarged portion 84 of the lever slot 80, the mower operator (not illustrated) depresses the blade engagement pedal 101, and this action pulls the pedal tension spring 110 forwardly and pivots the lever retaining member 90 from the lever release position illustrated in FIG. 7 to the lever retaining position illustrated in FIGS. 4 and 8. Consequently, the mower operator can remove his or her hand from the blade engagement lever 70 and sustain rotation of the mower cutting blade as long as he or she maintains the blade engagement pedal 101 in the depressed position, since the tension spring 110 maintains the lever retaining member 90 in the lever-engaging and retaining position illustrated in FIGS. 4 and 8. Furthermore, as the blade engagement pedal 101 is depressed, the lever retaining member 90 draws the blade release rod 2 forwardly until the rod bend 5 portion of the shift loop 4 engages the linkage pin 57. The mower operator drives the riding mower 30 forwardly by grasping the gear shift lever 50, removing it from the neutral selector notch 64, pushing it forwardly and placing it in a selected one of the forward selector notches 62, depending on the desired forward drive speed of the riding mower 30. As long as the blade engagement pedal 101 remains in the depressed configuration and the gear shift lever 50 remains in one of the forward selector notches 62, the riding mower 30 continues to mow in the forward direction. When it is desired to drive the riding mower 30 in the reverse direction, the mower operator grasps the gear shift lever 50, removes the gear shift lever 50 from the forward selector notch 62 and positions the gear shift lever 50 in the rear selector notch 63. Accordingly, as the mower operator moves the gear shift lever 50 rearwardly in the lever slot 61, the gear shift lever 50 rotates the horizontal shift rod 52 of the shift linkage 54 in the clockwise direction in FIG. 5, and this action moves the first linkage member 55 and second linkage member 56 of the shift linkage 54, rearwardly. The shift linkage 54 in turn pivots the transmission linkage 58 rearwardly, thus shifting the mower transmission (not illustrated) into the reverse driving mode. Because the rod bend 5 portion of the shift loop 4 of the blade release rod 2 is engaged by the linkage pin 57 of the shift linkage 54 when the blade engagement pedal 101 is depressed and the gear shift lever 50 is located in the neutral selector notch 64, rearward movement of the gear shift lever 50 beyond the neutral selector notch 64 to the rear selector notch 63 draws the blade release rod 2 rearwardly. This reverse movement of the blade release rod 2 causes the blade release rod 2 to pivot the lever retaining member 90 rearwardly on the bracket plate 82, thereby disengaging the lever retaining member 90 from the blade engagement lever 70 and causing the blade engagement lever 70 to automatically shift from the enlarged portion 84 to the elongated, narrow portion 85 of the lever slot 80, by operation of the shift roller (not illustrated). As the blade engagement lever 70 shifts rearwardly in the lever slot 80, the drive mechanism of the mower cutting blade is automatically disengaged from the rotating blade and a conventional brake mechanism is automatically applied to the blade to halt rotation of the blade.

It will be appreciated by those skilled in the art that the blade release rod 2 operates in the foregoing manner to release or disengage the blade driving mechanism of the riding mower 30 from the mower cutting blade even as the blade engagement pedal 101 remains depressed during reverse driving of the riding mower 30, since the blade release rod 2 pivots the lever retaining member 90 rearwardly against the forward bias exerted by the pedal tension spring 110 as the gear shift lever 50 is shifted rearwardly beyond the neutral selector notch 64. As the gear shift lever 50 of the riding mower 30 is subsequently moved from the rear selector notch 63 to the neutral selector notch 64, or to a selected forward selector notch 62 in order to again drive the riding mower 30 in the forward direction, as desired, the horizontal shift rod 52 of the shift linkage 54 is rotated in the counterclockwise direction illustrated in FIG. 5. Simultaneously, the linkage pin 57 of the shift linkage 54 travels in the shift loop 4 of the blade release rod 2, from the rod bend 5 toward the rod angle 7 of the shift loop 4. This movement of the linkage pin 57 creates a gap between the rod bend 5 and the linkage pin 57, enabling the lever retaining member 90 to pivot forwardly to the lever retaining position illustrated in FIG. 8 and draw the blade release rod 2 forwardly as the mower operator again depresses the blade engagement pedal 101, after the blade engagement lever 70 is again shifted into the enlarged portion 84 of the lever slot 80 to mow in the forward direction.

Referring next to FIGS. 3, 3A and 9–11 of the drawings, in a second embodiment, the reverse mowing prevention device of this invention is generally illustrated by reference numeral 12. As illustrated in FIGS. 3 and 3A, a portion of the straight rod segment 3 which is located in spaced-apart relationship with respect to the shift loop 4 of the blade release rod 2, is shaped into a blade release loop 13, having a loop bend 10 and a substantially perpendicular loop angle 11. As illustrated in FIG. 3, the blade release loop 13 is typically disposed in substantially perpendicular relationship with respect to the plane of the shift loop 4. That portion of the blade release rod 2 which is located beyond the blade release loop 13, opposite the shift loop 4 is wrapped around the straight rod segment 3 at a pair of rod loops 16, to define an override handle 14, extending through a handle bracket 31a (FIG. 9), attached to the mower frame 31. The override handle 14 is typically terminated by a finger loop 15. A front attachment spring 19, terminated by a spring loop 19a, is provided on the blade release loop 13 at the loop bend 10, and typically connects to the blade-engaging pedal 101 (FIG. 9), while a rear attachment spring 20 is provided on the blade release loop 13 at the loop angle 11, which rear attachment spring 20 is typically fixed at the opposite end to a belt guide screw or bolt 26, seated on a belt guide 25, extending from the mower frame 31. It will be appreciated that both springs facilitate attachment of the blade release rod 2 under tension to the riding mower 30, as hereinafter described.

As illustrated in FIGS. 9–11, in application of the reverse mowing prevention device 12 as hereinafter further described, the shift loop 4 is attached to the shift linkage 54 (FIG. 5) of the riding mower 30 as heretofore described with respect to the first embodiment illustrated in FIG. 3. The blade release loop 13 of the blade release rod 2 is extended around a blade release bolt 17, which projects upwardly from the lever retaining member 90, through a blade release rod opening 96 provided in the lever retaining member 90 (FIGS. 7 and 8) and is biased in place by the front attachment spring 19. Accordingly, reverse movement of the gear shift lever 50 from one of the forward selector notches 62 or neutral selector notch 64 and into the rear selector notch 63, causes the blade release loop 13 of the blade release rod 2 to pull the blade release bolt 17 rearwardly and pivot the lever retaining member 90 from the lever-retaining configuration illustrated in FIG. 8, to the lever-releasing configuration illustrated in FIG. 7, thereby disengaging the mower cutting blade from the blade-driving configuration. By grasping the finger loop 15 and operation of the override handle 14, the blade release loop 13 can be selectively lifted from the blade release bolt 17 against the tension in the front attachment spring 19, to rest on an override flange 18, provided on the blade release bolt 17, by the tension in the rear attachment spring 20, under circumstances in which it is desired to mow as the riding mower 30 is driven in the reverse direction, as hereinafter further described.

Referring again to FIGS. 3–5, 7, 8 and to FIGS. 9–11 of the drawings, in application of the reverse mowing prevention device 12, the shift loop 4 of the blade release rod 2 is initially attached to the shift linkage 54 of the riding mower 30, as illustrated in FIG. 5 and described above with respect to the first embodiment illustrated in FIG. 2. The spring loop 19a of the front attachment spring 19 is typically attached to the blade engagement pedal 101 (FIG. 9) and the spring loop 20a of the rear attachment spring 20 is typically attached to the belt guide, screw or bolt 26, mounted on the belt guide 25, which extends upwardly from the top surface of the blade housing 40, behind the blade engagement lever 70, as illustrated in FIGS. 4 and 9. As further illustrated in FIG. 9, the upwardly-extending override handle 14 of the reverse mowing prevention device 12 typically extends through a handle bracket 31a, attached to the mower frame 31, and the blade release loop 13 is normally positioned around the blade release bolt 17 as illustrated in FIGS. 9 and 10. Accordingly, after the engine 36 is started, mowing is begun by shifting the blade engagement lever 70 forwardly from the elongated portion 85 into the enlarged portion 84 of the lever slot 80, to engage the driving mechanism of the mower cutting blade (not illustrated) as heretofore described. While holding the blade engagement lever 70 in the enlarged portion 84 of the lever slot 80, the mower operator (not illustrated) depresses the blade engagement pedal 101, to pull the pedal tension spring 110 (FIG. 4) forwardly and pivot the lever retaining member 90 from the lever release position illustrated in FIG. 7, to the lever retaining position illustrated in FIGS. 4 and 8. To begin forward mowing, as heretofore described the operator removes the gear shift lever 50 from the neutral selector notch 64, pushes the gear shift lever 50 forwardly in the lever slot 80 and places the gear shift lever 50 in a selected one of the forward selector notches 62, depending on the desired drive speed of the riding mower 30. As the mower operator subsequently removes the gear shift lever 50 from the forward selector notch 62 to the rear selector notch 63, as desired to drive the riding mower 30 in reverse, as heretofore described, the gear shift lever 50 moves the shift linkage 54 rearwardly, causing the linkage pin 57 of the shift linkage 54 to draw the shift loop 4 of the blade release rod 2 rearwardly as the gear shift lever 50 is shifted rearwardly beyond the neutral selector notch 64. Consequently, the blade release loop 13, arched around the blade release bolt 17, pulls the blade release bolt 17 rearwardly as the gear shift lever 50 is shifted rearwardly beyond the neutral selector notch 64. This action pivots the lever retaining member 90 from the lever-retaining position illustrated in FIG. 8 to the blade-release position illustrated in FIG. 7, causing the blade engagement lever 70 to automatically shift from the enlarged portion 84 to the elongated portion 85 of the lever slot 80 and disengage the mower cutting blade from the blade-driving mechanism. As illustrated in FIG. 11, it will be appreciated by those skilled in the art that the blade release loop 13 can be removed or cleared from the blade release bolt 17 to facilitate mowing in reverse, as desired. This is accomplished by grasping the finger loop 15 and lifting the override handle 14 extending through the handle bracket 31a against the tension in the front attachment spring 19, thus clearing the blade release loop 13 from the blade release bolt 17, and resting the blade release loop 13 on the override flange 18 by operation of the rear attachment spring 20, as the gear shift lever 50 is shifted rearwardly beyond the neutral selector notch 64 into the rear selector notch 63. Accordingly, the lever retaining member 90 remains in the lever retaining position illustrated in FIG. 8, and the blade engagement lever 70 maintains the mower cutting blade in driving configuration as long as the blade engagement pedal 101 remains depressed. The mower operator can again mow in the forward direction, as desired, by shifting the gear shift lever 50 from the rear selector notch 63 to the forward selector notch 62, while maintaining the mower cutting blade in driving configuration by maintaining the blade engagement pedal 101 in the depressed configuration.

It will be appreciated by those skilled in the art that the reverse mowing prevention devices of this invention provide a simple and yet effective mechanism for preventing inadvertent mowing in reverse of riding mowers. The reverse mowing prevention devices are capable of easy installation on existing mowers having an automatic blade stop (ABS) feature characterized by a manually-operated blade engagement lever for selectively engaging a mower blade in driving configuration, a pivoting lever retaining member for selectively retaining the blade engagement lever in the blade-driving configuration, typically by depressing a foot-operated blade engagement pedal, and a brake mechanism for stopping blade rotation upon release of the blade engagement pedal. It will be further appreciated by those skilled in the art that while the reverse mowing prevention device 12 illustrated in FIG. 3 of the drawings enables the mower operator to selectively mow in reverse as desired, in order to do so the operator must exercise conscious effort, increasing the likelihood that the operator will first deliberately examine the area behind the mower for children, animals or other obstructions.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A reverse mowing prevention device for a riding mower having a gear shift lever, a blade engagement lever for selectively engaging a mower blade in driving configuration and a lever retaining member for selectively retaining the blade engagement lever in blade-driving configuration, said reverse mowing prevention device comprising a blade release rod having a first end for engaging the lever retaining member and a second end for engaging the gear shift lever, whereby said blade release rod disengages the lever retaining member from the blade engagement lever and the blade engagement lever moves from said blade-driving configuration to a blade-disengaging configuration, responsive to rearward movement of the gear shift lever.

2. The device of claim 1 comprising a retaining member segment shaped in said first end of said blade release rod for engaging the lever retaining member.

3. The device of claim 1 comprising a shift loop shaped in said second end of said blade release rod for engaging the gear shift lever.

4. The device of claim 1 comprising a retaining member segment shaped in said first end of said blade release rod for engaging the lever retaining member and a shift loop shaped in said second end of said blade release rod for engaging the gear shift lever.

5. The device of claim 1 comprising a blade release bolt extending upwardly from the lever retaining member, a blade release loop provided in said first end of said blade release rod for engaging said blade release bolt, a front attachment spring provided on said blade release loop for engaging the mower forwardly of said blade release loop and a rear attachment spring provided on said blade release loop for engaging the mower rearwardly of said blade release loop.

6. The device of claim 5 comprising a shift loop shaped in said second end of said blade release rod for engaging the gear shift lever.

7. The device of claim 5 comprising an override handle carried by said blade release rod for selectively lifting said blade release loop from said blade release bolt, whereby the lever retaining member remains in contact with the blade engagement lever and the blade engagement lever remains in blade-driving configuration responsive to rearward movement of the gear shift lever.

8. The device of claim 5 comprising a shift loop shaped in said second end of said blade release rod for engaging the gear shift lever and an override handle carried by said blade release rod for selectively lifting said blade release loop from said blade release bolt, whereby the lever retaining member remains in contact with the blade engagement lever and the blade engagement lever remains in blade-driving configuration responsive to rearward movement of the gear shift lever.

9. The device of claim 8 comprising an override handle carried by said blade release rod for selectively lifting said blade release loop from said blade release bolt, whereby the lever retaining member remains in contact with the blade engagement lever and the blade engagement lever remains in blade-driving configuration responsive to rearward movement of the gear shift lever.

10. The device of claim 9 comprising a shift loop shaped in said second end of said blade release rod for engaging the gear shift lever.

11. A reverse mowing prevention device for a riding mower having a blade engagement lever for selectively engaging a mower blade in driving configuration, a lever retaining member for selectively retaining the blade engagement lever in blade-driving configuration and a gear shift lever connected to a mower transmission system by means of a shift linkage, said reverse mowing prevention device comprising a blade release rod having an elongated straight rod segment; a retaining member segment located at a first end of said straight rod segment for engaging the lever retaining member; and a shift loop located at a second end of said straight rod segment for engaging the shift linkage of the riding mower, whereby said blade release rod disengages the lever retaining member from the blade engagement lever and the blade engagement lever moves from said blade-driving configuration to a blade-disengaging configuration, responsive to rearward movement of the gear shift lever for reverse movement of the riding mower.

12. The device of claim 11 herein said shift loop comprises a rod bend shaped in said straight rod segment, a short rod segment located distal to said rod bend, a rod angle located distal to said short rod segment and a rod hook terminating said second end of said straight rod segment for removably engaging said straight rod segment of said blade release rod.

13. A reverse mowing prevention device for a riding mower having a blade engagement lever for selectively engaging a mower blade in driving configuration, a lever retaining member for selectively retaining the blade engagement lever in blade-driving configuration and a gear shift lever connected to a transmission system by means of a shift linkage, said reverse mowing prevention device comprising a blade release bolt upward-standing from the lever retaining member; a blade release rod having a straight rod segment, a blade release loop shaped in the front end of said straight rod segment for engaging said blade release bolt and a shift loop shaped in the rear end of said straight rod segment for engaging the shift linkage, whereby said blade release loop engages said blade release bolt, the lever retaining member is disengaged from the blade engagement lever and the blade engagement lever moves from said blade-driving configuration to a blade-disengaging configuration, responsive to rearward movement of the gear shift lever; a front attachment spring provided on said blade release loop for engaging the mower forwardly of said blade release loop and a rear attachment spring provided on said blade release loop for engaging the mower rearwardly of said blade release loop; and an override handle carried by said blade release rod for selectively lifting said blade release loop from said blade release bolt, whereby the lever retaining member remains in contact with the blade engagement lever and the blade engagement lever remains in said blade-driving configuration responsive to said rearward movement of the gear shift lever for reverse movement of the riding mower.

14. The device of claim 13 comprising a finger loop terminating said override handle for finger-grasping said override handle.

15. The device of claim 13 wherein said shift loop comprises a rod bend shaped in said straight rod segment, a short rod segment located distal to said rod bend, a rod angle located distal to said short rod segment and a rod hook terminating said second end of said straight rod segment for removably engaging said straight rod segment of said blade release rod.

16. The device of claim 13 comprising a finger loop terminating said override handle for finger-grasping said override handle, and wherein said shift loop comprises a rod bend shaped in said straight rod segment, a short rod segment located distal to said rod bend, a rod angle located distal to said short rod segment and a rod hook terminating said second end of said straight rod segment for removably engaging said straight rod segment of said blade release rod.

* * * * *